United States Patent
Pfeiffer et al.

(10) Patent No.: US 11,122,180 B2
(45) Date of Patent: Sep. 14, 2021

(54) SYSTEMS, METHODS, APPARATUSES, AND COMPUTER-READABLE STORAGE MEDIA FOR COLLECTING COLOR INFORMATION ABOUT AN OBJECT UNDERGOING A 3D SCAN

(71) Applicant: DENTSPLY SIRONA Inc., York, PA (US)

(72) Inventors: Joachim Pfeiffer, Bensheim (DE); Jian Lu, San Gabriel, CA (US); Alexei Harvard, Pasadena, CA (US); Bjoern Voss, Heidelberg (DE); Frank Thiel, Ober-Ramstadt (DE)

(73) Assignee: DENTSPLY SIRONA Inc., York, PA (US)

( * ) Notice: Subject to any disclaimer, the term of this patent is extended or adjusted under 35 U.S.C. 154(b) by 498 days.

(21) Appl. No.: 14/268,201

(22) Filed: May 2, 2014

(65) Prior Publication Data
US 2015/0319326 A1 Nov. 5, 2015

(51) Int. Cl.
*H04N 1/00* (2006.01)
*H04N 1/46* (2006.01)
(Continued)

(52) U.S. Cl.
CPC ....... *H04N 1/00827* (2013.01); *A61C 9/0053* (2013.01); *G01B 11/2513* (2013.01);
(Continued)

(58) Field of Classification Search
CPC .................. G06K 7/10722; G06K 7/14; G06T 2207/10024; H04N 1/486; H04N 1/193;
(Continued)

(56) References Cited

U.S. PATENT DOCUMENTS

| 3,971,065 A | 7/1976 | Bayer |
| 6,556,707 B1 | 4/2003 | Yagishita |

(Continued)

FOREIGN PATENT DOCUMENTS

| CN | 102292980 A | 12/2011 |
| CN | 103221975 A | 7/2013 |

(Continued)

OTHER PUBLICATIONS

M. Grundland et al., "Decolorize: fast, contrast enhancing, color to grayscale conversion," Pattern Recognition, vol. 40, Issue 11, 2007, pp. 2891-2896.

(Continued)

*Primary Examiner* — Farhan Mahmud
(74) *Attorney, Agent, or Firm* — DENTSPLY SIRONA Inc.

(57) ABSTRACT

A method of performing a three-dimensional (3D) scan of an object includes applying an optical contrast powder to the object and illuminating the object with light. First and second two-dimensional (2D) color image data corresponding to the object is generated. First and second 2D monochrome image data corresponding to the object is generated using the first and second 2D color image data. 3D data corresponding to the object is generated using the first and second monochrome 2D image data. Color 3D image data corresponding to the object is generated by adding color information to the 3D data. The color 3D image data is displayed.

26 Claims, 12 Drawing Sheets

(51) Int. Cl.
  *H04N 1/195*   (2006.01)
  *A61C 9/00*    (2006.01)
  *G01B 11/25*   (2006.01)
  *H04N 13/254*  (2018.01)
  *H04N 13/207*  (2018.01)

(52) U.S. Cl.
  CPC ......... *H04N 1/19594* (2013.01); *H04N 1/465* (2013.01); *H04N 13/207* (2018.05); *H04N 13/254* (2018.05)

(58) Field of Classification Search
  CPC .. H04N 13/0253; H04N 1/484; H04N 5/2254; H04N 5/23212; H04N 13/0257
  See application file for complete search history.

(56) References Cited

U.S. PATENT DOCUMENTS

| | | | |
|---|---|---|---|
| 6,778,186 | B2 | 8/2004 | Mehigan |
| 7,372,642 | B2 | 5/2008 | Rohaly et al. |
| 2006/0290794 | A1* | 12/2006 | Bergman ............... H04N 5/367 348/246 |
| 2009/0245584 | A1 | 10/2009 | Masuda |
| 2010/0128109 | A1 | 5/2010 | Banks |
| 2012/0218531 | A1 | 8/2012 | Hontake |
| 2013/0235165 | A1 | 9/2013 | Gharib et al. |
| 2013/0244199 | A1 | 9/2013 | Lu et al. |
| 2013/0260340 | A1* | 10/2013 | Stegall .................. A61B 6/481 433/217.1 |
| 2013/0301906 | A1* | 11/2013 | Yoon ...................... G06T 17/00 382/154 |
| 2015/0037750 | A1* | 2/2015 | Moalem ............... A61B 5/0088 433/29 |

FOREIGN PATENT DOCUMENTS

| | | |
|---|---|---|
| JP | 2003016477 A | 1/2003 |
| JP | 2009293971 A | 6/2008 |
| JP | 2009-284188 A | 12/2009 |
| JP | 2013-068489 A | 4/2013 |
| JP | 2013164789 A | 8/2013 |
| WO | 97/02788 A1 | 1/1997 |
| WO | 2012/030357 A1 | 3/2012 |

OTHER PUBLICATIONS

M. Qiu et al., "Contrast Maximizing and Brightness Preserving Color to Grayscale Image Conversion," CGIV2008, 4th European Conference on Colour in Graphics, Imaging, and Vision, Final Program and Proceedings, 2008, pp. 347-351.

P. Shirley et al., "Texture Mapping," Fundamentals of Computer Graphics, Third Edition, 2009, pp. 243-259, A K Peters, Natick, Massachusetts.

Jan. 2, 2018 Office Action in Chinese Patent Application No. 201580022299.3.

Japanese Office Action dated Nov. 20, 2018.

* cited by examiner

| CF1 | CF2 | CF3 | CF4 | CF5 | CF6 | CF7 | CF8 |
|---|---|---|---|---|---|---|---|
| CF9 | CF10 | CF11 | CF12 | CF13 | CF14 | CF15 | CF16 |
| CF17 | CF18 | CF19 | CF20 | CF21 | CF22 | CF23 | CF24 |
| CF25 | CF26 | CF27 | CF28 | CF29 | CF30 | CF31 | CF32 |
| CF33 | CF34 | CF35 | CF36 | CF37 | CF38 | CF39 | CF40 |
| CF41 | CF42 | CF43 | CF44 | CF45 | CF46 | CF47 | CF48 |
| CF49 | CF50 | CF51 | CF52 | CF53 | CF54 | CF55 | CF56 |
| CF57 | CF58 | CF59 | CF60 | CF61 | CF62 | CF63 | CF64 |

400

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

400

| P1 | P2 | P3 | P4 | P5 | P6 | P7 | P8 |
|----|----|----|----|----|----|----|----|
| P9 | P10 | P11 | P12 | P13 | P14 | P15 | P16 |
| P17 | P18 | P19 | P20 | P21 | P22 | P23 | P24 |
| P25 | P26 | P27 | P28 | P29 | P30 | P31 | P32 |
| P33 | P34 | P35 | P36 | P37 | P38 | P39 | P40 |
| P41 | P42 | P43 | P44 | P45 | P46 | P47 | P48 |
| P49 | P50 | P51 | P52 | P53 | P54 | P55 | P56 |
| P57 | P58 | P59 | P60 | P61 | P62 | P63 | P64 |

500

| CPV1 | CPV2 | CPV3 | CPV4 | CPV5 | CPV6 | CPV7 | CPV8 |
|------|------|------|------|------|------|------|------|
| CPV9 | CPV10 | CPV11 | CPV12 | CPV13 | CPV14 | CPV15 | CPV16 |
| CPV17 | CPV18 | CPV19 | CPV20 | CPV21 | CPV22 | CPV23 | CPV24 |
| CPV25 | CPV26 | CPV27 | CPV28 | CPV29 | CPV30 | CPV31 | CPV32 |
| CPV33 | CPV34 | CPV35 | CPV36 | CPV37 | CPV38 | CPV39 | CPV40 |
| CPV41 | CPV42 | CPV43 | CPV44 | CPV45 | CPV46 | CPV47 | CPV48 |
| CPV49 | CPV50 | CPV51 | CPV52 | CPV53 | CPV54 | CPV55 | CPV56 |
| CPV57 | CPV58 | CPV59 | CPV60 | CPV61 | CPV62 | CPV63 | CPV64 |

510

SYSTEMS, METHODS, APPARATUSES, AND COMPUTER-READABLE STORAGE MEDIA FOR COLLECTING COLOR INFORMATION ABOUT AN OBJECT UNDERGOING A 3D SCAN

BACKGROUND

Field

The present disclosure relates to collecting color information about an object undergoing a three-dimensional (3D) scan, and, more particularly, to generating and displaying 3D color image data corresponding to one or more objects, for example, one or more teeth.

Description of Related Art

Computer-Aided Design (CAD) and Computer-Aided Manufacturing (CAM) techniques have been used to create digital models of the interiors of patients' mouths. The digital models have been used to design and manufacture prosthetic dental items such as inlays, onlays, bridges, crowns, and veneers. Conventional systems used to scan the interiors of patients' mouths to produce such digital models generate and display 3D monochrome data. When performing a 3D scan inside a patient's mouth with a camera, it can be difficult to orient the camera correctly to scan the anatomy of interest and to distinguish between clinically relevant areas (e.g., the teeth) and unnecessary areas (e.g., the tongue and cheek). This is particularly true with systems that collect and display 3D information in real time.

SUMMARY

Existing limitations associated with the foregoing, as well as other limitations, can be overcome by a method for performing a 3D scan of an object, and by a system, an apparatus, and a computer program that operate in accordance with the method.

According to an example embodiment herein, the method comprises generating first and second two-dimensional (2D) color image data corresponding to an illuminated object, where the first and second 2D color image data includes pixels. The method also includes generating first and second 2D monochrome image data respectively corresponding to the first and second 2D color image data, generating 3D data using the first and second 2D monochrome image data, and generating 3D color image data by combining color information obtained from at least one of the first and second 2D color image data with the 3D data.

In another example embodiment herein, the method further comprises displaying the 3D color image data on a display unit. In a further example embodiment herein, the 3D color image data is displayed on the display unit in real time.

In yet another example embodiment, the method further comprises displaying at least one of the first and second 2D color image data on a display unit.

Also in one example embodiment herein, the method further comprises downsampling the first and second 2D color image data to generate downsampled 2D color image data prior to generating the first and second 2D monochrome image data. In a further example embodiment herein, the 2D color image data includes a plurality of color pixel values, the downsampled 2D color image data includes a plurality of color pixel values, and the color pixel values of the downsampled 2D color image data corresponding to four adjacent pixels are generated using sixteen color pixel values of the 2D color image data.

In another example embodiment herein, the generating of the first 2D color image data is performed using a first portion of a color image sensor, and the generating of the second 2D color image data is performed using a second portion of the color image sensor. In a further example embodiment herein, the first portion of the color image sensor generates the first 2D color image data based on light that has been reflected by the object and that has passed through a first aperture of a camera, and the second portion of the color image sensor generates the second 2D color image data based on light that has been reflected by the object and that has passed through a second aperture of the camera that is different from the first aperture.

In yet another example embodiment herein, the 2D color image data includes a plurality of color pixel values, the 2D monochrome image data includes a plurality of monochrome pixel values, and each monochrome pixel value is a weighted average value of four color pixel values corresponding to four neighboring pixels of the 2D color image data.

In yet another example embodiment herein, the 2D color image data includes a plurality of color pixel values, and the 2D monochrome image data includes pixels of the 2D color image data having one color.

In some example embodiments herein, the method further comprises applying an optical contrast powder to the object. In another example embodiment herein, the method further comprises performing color correction on portions of the color information that correspond to the optical contrast powder. In a further example embodiment herein, the optical contrast powder includes black particles, white particles, or black and white particles. In yet another example embodiment herein, the optical contrast powder includes particles of at least two colors, and particles of a first color of the optical contrast powder absorb a different amount of a color of light than particles of a second color of the optical contrast powder.

In an example embodiment herein, the method further comprises illuminating the object with light. In one example embodiment herein, the object is illuminated with white light. In another example embodiment herein, the object is illuminated with a plurality of colored lights. In yet another example embodiment herein, the object is illuminated with structured light.

The method can be useful for displaying precise, color 3D model of the inside of a patient's mouth and assisting dental professionals in identifying clinically relevant areas. For example, the method can assist a dental professional to identify a margin between a ground-down portion of a tooth and an untouched portion of the tooth, thus facilitating optimal preparation and placement of a dental crown relative to the margin. The method also can be useful for providing vivid and realistic visual feedback to dental professionals performing 3D scans, thus making the scanning process easier.

Further features and advantages, as well as the structure and operation of various embodiments herein, are described in detail below with reference to the accompanying drawings.

DETAILED DESCRIPTION

Figure 1A:
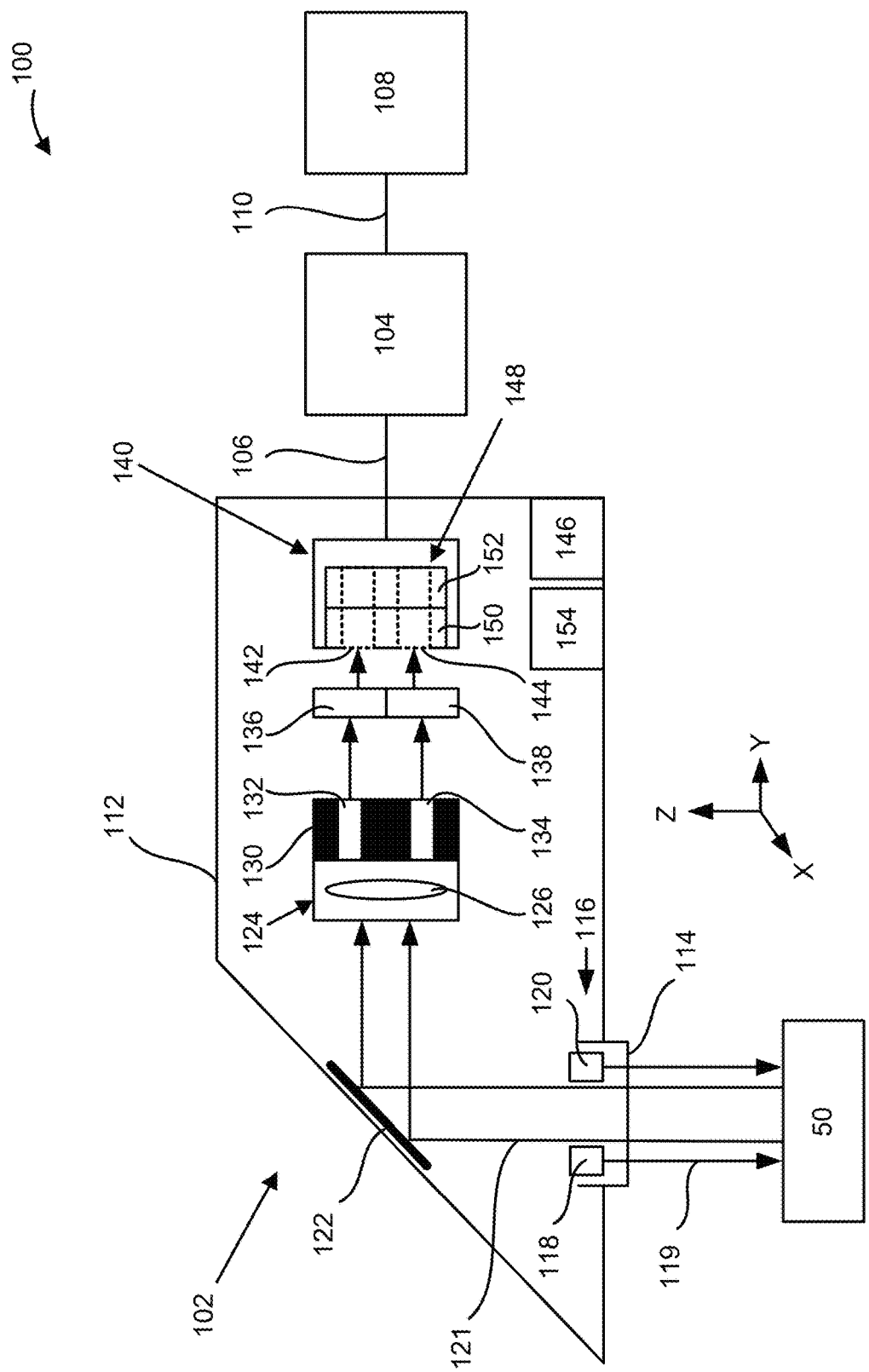
FIG. 1A illustrates a block diagram of an example 3D scanning system for generating and displaying color information about an object undergoing a scan according to an example embodiment herein.

FIG. 1A illustrates a block diagram of a 3D scanning system 100 that collects color information from an object 50 undergoing a 3D scan and displays a 3D color representation of the object 50. The 3D scanning system 100 includes a handpiece 102, a computer system 104 connected to the handpiece using a cable 106, and a display unit 108 connected to the computer system 104 using a cable 110.

The handpiece 102 includes a housing 112 that has a window 114 in a lower surface thereof. The handpiece 102 also includes an illumination unit 116 that projects light 119 onto the object 50 through the window 114. According to an example embodiment herein, the illumination unit 116 includes light emitting diodes (LEDs), for example, LEDs 118 and 120, that project white light as light 119 onto the object 50. In another example embodiment herein, the illumination unit 116 includes a plurality of white light projecting LEDs, the plurality numbering, for example, twelve such LEDs (not shown). According to still another example embodiment herein, the illumination unit 116 includes a plurality of LEDs (e.g., three LEDs; not shown), that project red, green, and blue light, respectively. In still a further example embodiment herein, the illumination unit 116 includes a plurality of colored LEDs (not shown) that, together, cover at least a substantial portion of the visible spectrum of light, such as, for example, the wavelength range of 390 nm to 700 nm. According to yet a further example embodiment herein, the illumination unit 116 projects structured light as light 119, having features, such as, for example, a random dot pattern, a dark and light stripe pattern, or a colored stripe pattern, and covering at least a substantial portion of the visible spectrum of light. In other embodiments, one or more aspects of the above embodiments can be used together.

At least some of the light 119 emitted from the illumination unit 116 is reflected by the object 50 back into the handpiece 102 through the window 114, as represented by reference numeral 121. A mirror 122 (which, in one example, can be formed by a prism) is provided to reflect the light 121 reflected by the object 50 toward an optical system 124. The optical system 124 includes at least one lens 126 and a mask 130 with a first aperture 132 and a second aperture 134 formed therein. The lens 126 focuses light reflected by the object 50 and the mirror 122 so that the light passes through the first aperture 132 and the second aperture 134.

Light passing through the first aperture 132 is projected onto a first portion 142 of a color pixel sensor array 148 of a camera unit 140 to form a first image. Similarly, light passing through the second aperture 134 is projected onto a separate second portion 144 of the color pixel sensor array 148 of the camera unit 140 to form a second image. According to an example embodiment herein, light passing through the first aperture 132 is projected onto the first portion 142 by way of an optical component 136, and light passing through the second aperture 134 is projected onto the second portion 144 by way of an optical component 138. In one example embodiment herein, the optical components 136 and 138 are rhomboid prisms.

Figure 1B:
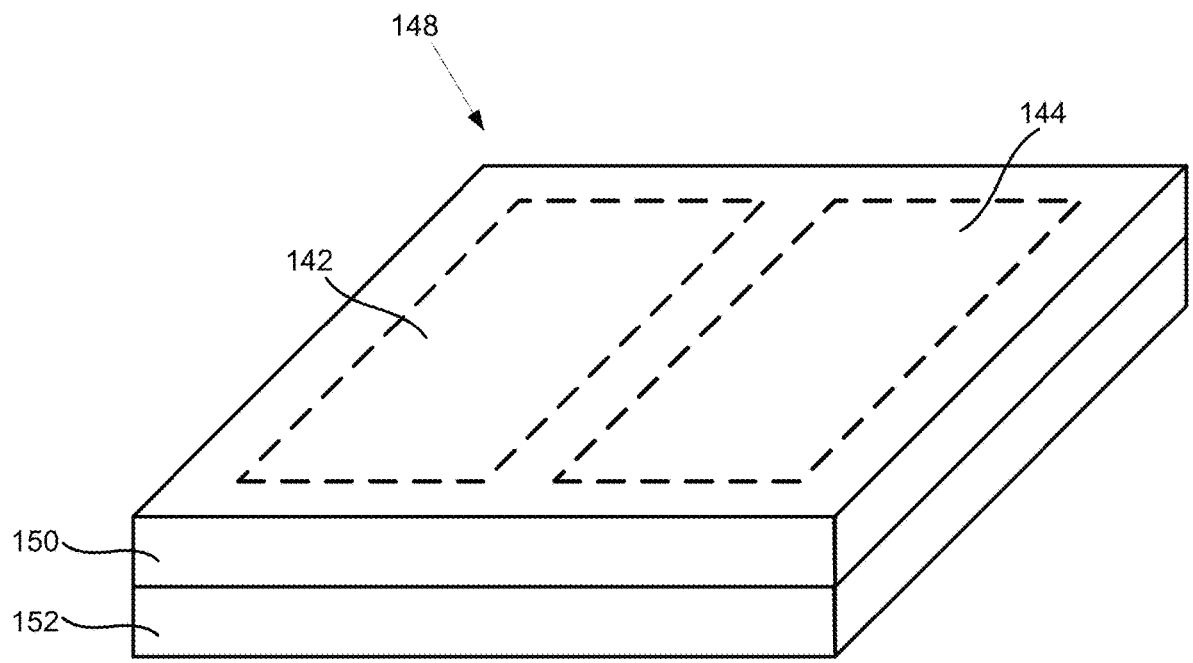
FIG. 1B illustrates a color pixel sensor array of the 3D scanning system of FIG. 1A according to an example embodiment herein.

According to an example embodiment herein, as illustrated in FIGS. 1A and 1B, the color pixel sensor array 148 includes a color filter array 150 that is disposed in front of a pixel sensor array 152, such that light projected on to either the first portion 142 or the second portion 144 of the color pixel sensor array 148 first passes through a corresponding portion of the color filter array 150 and then is similarly transmitted to a corresponding portion of the pixel sensor array 152, as will be described further herein.

Referring again to FIG. 1A, the first portion 142 and the second portion 144 of the color pixel sensor array 148 perform image acquisition by responding to received light to output RGB signals having three values, each of the three values being respectively proportional to the intensities of red light, green light, and blue light projected onto each of the first portion 142 and the second portion 144 of the color pixel sensor array 148. The signals from the pixels of the first portion 142 and second portion 144 of the color pixel sensor array 148 are provided (by way of element 152) to the computer system 104 via the cable 106, and the computer system 104 responds by creating two-dimensional (2D) image data from the signals in a known manner. First and second 2D image data of the object 50 are thereby acquired respectively from the first portion 142 and second portion 144 of the color pixel sensor array 148.

In some embodiments, the signals from the first and second portions 142 and 144 of the color pixel sensor array 148 output by the camera unit 140 are analog signals, which are converted into corresponding digital signals by analog-to-digital converters included in the computer system 104. In other embodiments, the camera unit 140 itself includes analog-to-digital converters that convert analog signals output from the first and second portions 142 and 144 of the color pixel sensor array 148 into corresponding digital signals that are then output by the camera unit 140 to the computer system 104 via the cable 106.

The handpiece 102 also includes a drive circuit 146. In one example embodiment herein, the drive circuit 146 can include more than one electrically connected circuit component, such as one or more individual circuit boards for driving and/or holding each of camera 140, LED 118, and/or LED 120. The drive circuit 146 controls operation of electronic elements and various components within the handpiece 102, including for example, and without limitation, the camera unit 140 and the illumination unit 116. In one example embodiment, the camera unit 140 triggers the drive circuit 146 to strobe the LEDs 118 and 120 at substantially the same time that the image is acquired by the camera unit 140 so that illumination of the object 50 and image acquisition occur substantially contemporaneously.

As will be described in detail below, the computer system 104 processes the signals provided by the camera unit 140 and generates 3D data that is provided by the system 104 via the cable 110 to the display unit 108, which displays a corresponding color 3D video in real time.

Figure 2:
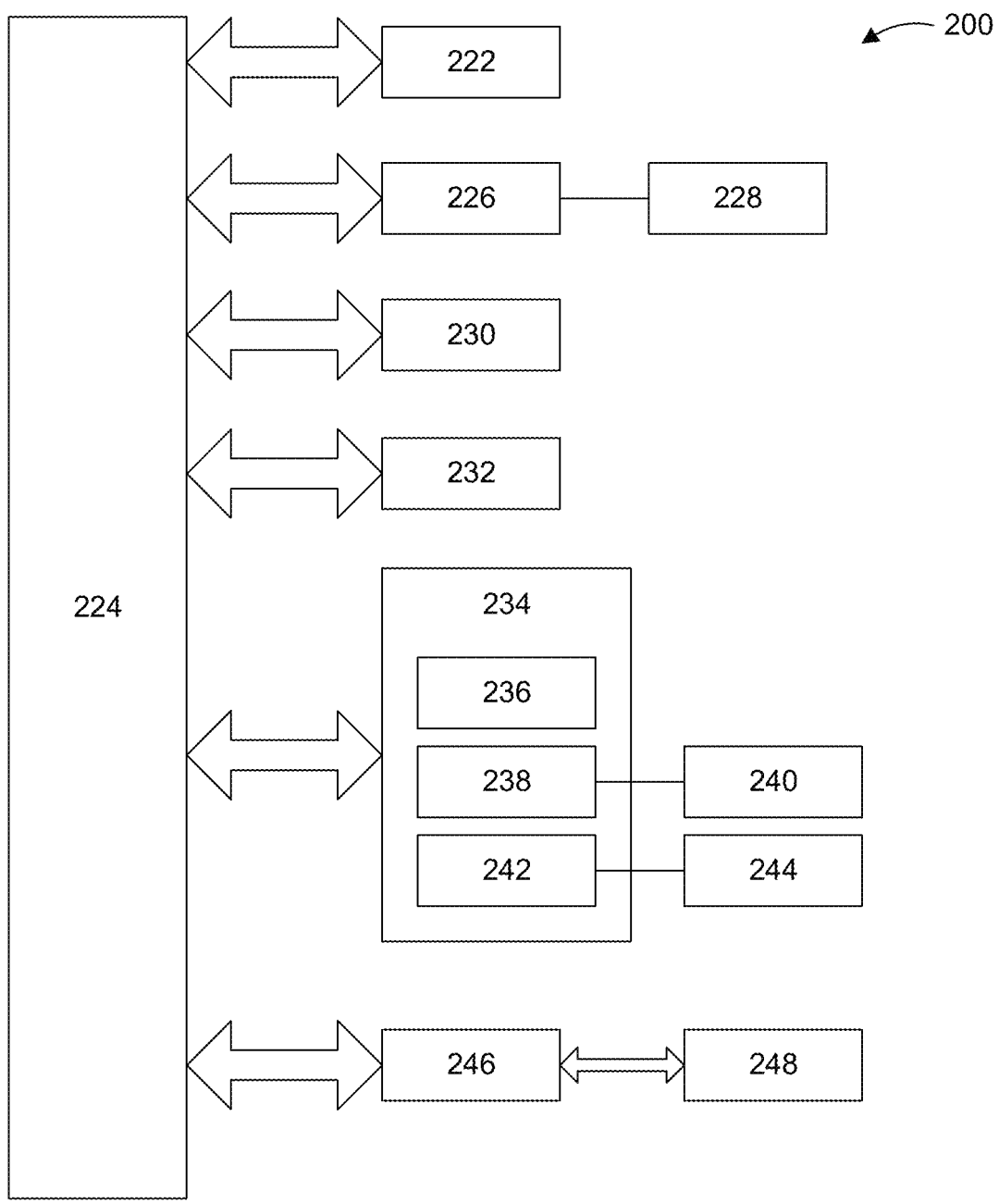
FIG. 2 illustrates a block diagram of an example computer system of the 3D scanning system shown in FIG. 1A.

FIG. 2 illustrates a block diagram of a computer system 200. In one example embodiment herein, at least some components of the computer system 200 (such as all those components, or all besides component 228) can form or be included in the computer system 104 shown in FIG. 1A, and computer system 200 is connected to handpiece 102 via cable 106 shown in FIG. 1A by way of communications interface 246 (mentioned below). The computer system 200 includes at least one computer processor 222 (also referred to as a "controller"). The computer processor 222 may include, for example, a central processing unit, a multiple processing unit, an application-specific integrated circuit ("ASIC"), a field programmable gate array ("FPGA"), or the like. The processor 222 is connected to a communication infrastructure 224 (e.g., a communications bus, a cross-over bar device, or a network). Although various embodiments are described herein in terms of this exemplary computer system 200, after reading this description, it will become apparent to a person skilled in the relevant art(s) how to implement the invention using other computer systems and/or architectures.

The computer system 200 also includes a display interface (or other output interface) 226 that forwards video graphics, text, and other data from the communication infrastructure 224 (or from a frame buffer (not shown)) for display on a display unit 228. In one example embodiment herein, the display unit 228 can form or be included in the display unit 108 and communication infrastructure 224 can form or be included in cable 110. The display interface 226 can include, for example, a video card with a graphics processing unit or a video card capable of calculating 3D single frame information. In particular, an example of such a video card can include an ATI or an NVIDIA video card.

The computer system 200 also includes an input unit 230 that can be used by a user of the computer system 200 to send information to the computer processor 222. For example, the input unit 230 can include a keyboard device and/or a mouse device or other input device. In one example, the display unit 228, the input unit 230, and the computer processor 222 can collectively form a user interface.

In an example embodiment that includes a touch screen, for example, the input unit 230 and the display unit 228 can be combined. In such an embodiment, an operator touching the display unit 228 can cause corresponding signals to be sent from the display unit 228 to the display interface 226, which can forward those signals to a processor such as processor 222, for example.

In addition, the computer system 200 includes a main memory 232, which preferably is a random access memory ("RAM"), and also may include a secondary memory 234. The secondary memory 234 can include, for example, a hard disk drive 236 and/or a removable-storage drive 238 (e.g., a floppy disk drive, a magnetic tape drive, an optical disk drive, a flash memory drive, and the like). The removable-storage drive 238 reads from and/or writes to a removable storage unit 240 in a well-known manner. The removable storage unit 240 may be, for example, a floppy disk, a magnetic tape, an optical disk, a flash memory device, and the like, which is written to and read from by the removable-storage drive 238. The removable storage unit 240 can include a non-transitory computer-readable storage medium storing computer-executable software instructions and/or data.

In alternative embodiments, the secondary memory 234 can include other computer-readable media storing computer-executable programs or other instructions to be loaded into the computer system 200. Such devices can include a removable storage unit 244 and an interface 242 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 244 and interfaces 242 that allow software and data to be transferred from the removable storage unit 244 to other parts of the computer system 200.

The computer system 200 also can include a communications interface 246 that enables software and data to be transferred between the computer system 200 and external devices. Examples of the communications interface 246 include a modem, a network interface (e.g., an Ethernet card), a communications port (e.g., a Universal Serial Bus ("USB") port or a FireWire® port), a Personal Computer Memory Card International Association ("PCMCIA") interface, and the like. Software and data transferred via the communications interface 246 can be in the form of signals, which can be electronic, electromagnetic, optical or another type of signal that is capable of being transmitted and/or received by the communications interface 246. Signals are provided to the communications interface 246 via a communications path 248 (e.g., a channel). The communications path 248 carries signals and can be implemented using wire or cable, fiber optics, a telephone line, a cellular link, a radio-frequency ("RF") link, or the like. The communications interface 246 may be used to transfer software or data between the computer system 200 and a remote server or cloud-based storage (not shown).

One or more computer programs (also referred to as computer control logic) are stored in the main memory 232 and/or the secondary memory 234. The computer programs also can be received via the communications interface 246. The computer programs include computer-executable instructions which, when executed by the controller/computer processor 222, cause the computer system 200 to perform the procedures as described herein and shown in FIGS. 3A and 3B, for example. Accordingly, the computer programs can control the computer system 104 and other components (e.g., the camera unit 140 and the display unit 108) of the 3D scanning system 100.

In one example embodiment herein, the software can be stored in a non-transitory computer-readable storage medium and loaded into the computer system 200 using the removable-storage drive 238, the hard disk drive 236, and/or the communications interface 246. Control logic (software), when executed by the controller/computer processor 222, causes the computer system 200, and more generally the 3D scanning system 100, to perform the procedures described herein.

In another example embodiment hardware components such as ASICs, FPGAs, and the like, can be used to carry out the functionality described herein. In a further example embodiment herein, ASICS or FPGAs or other circuitry may be used in the camera electronics to perform, for example, image pre-processing, such as image compression. Implementation of such a hardware arrangement so as to perform the functions described herein will be apparent to persons skilled in the relevant art(s) in view of this description.

Having described the computer system 200 of FIG. 2, the 3D scanning system 100 will now be further described in conjunction with FIGS. 3-10.

Figure 3A:
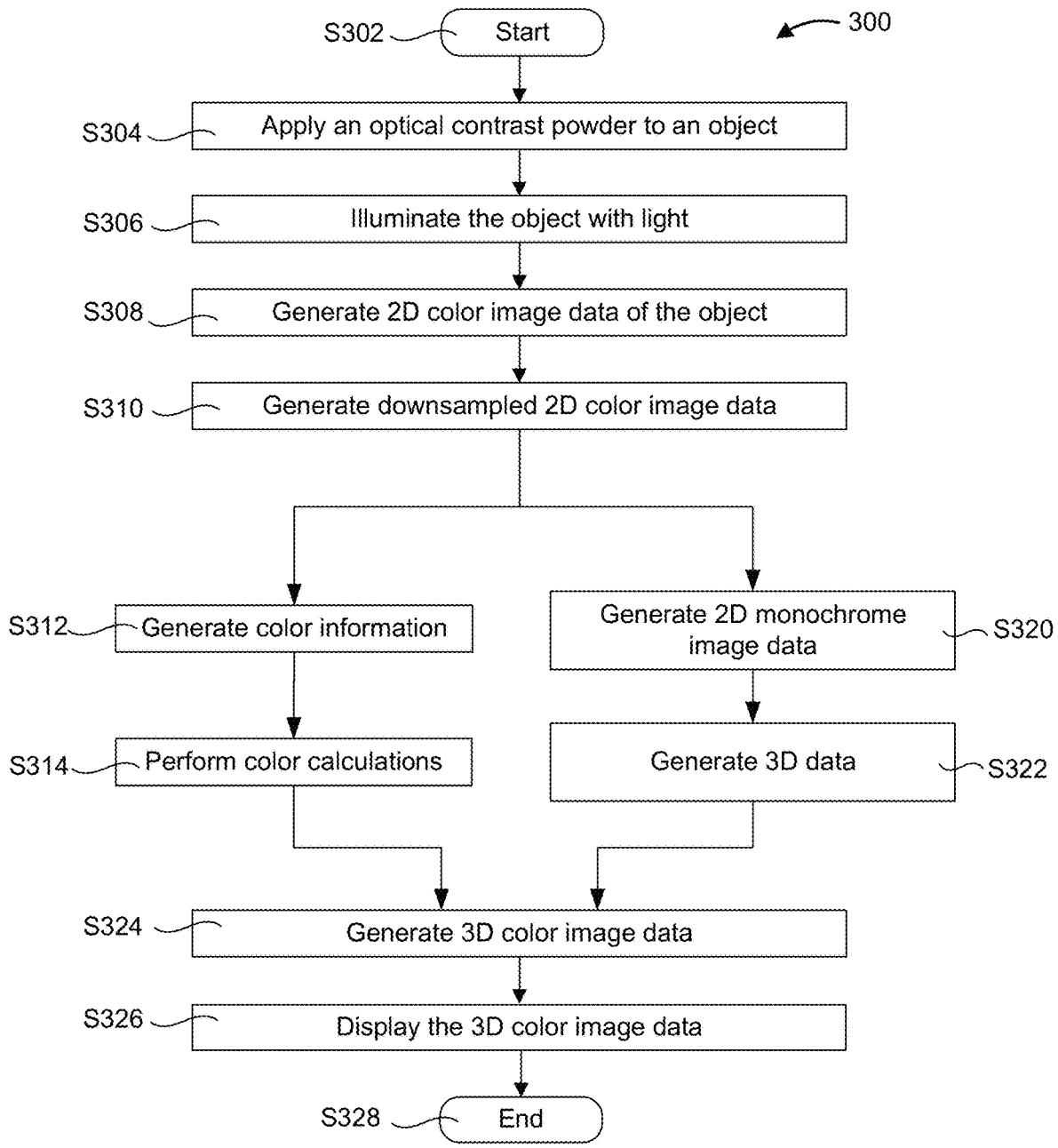
FIG. 3A is a flow diagram of an example process for generating and displaying color information about an object undergoing a 3D scan according to an example embodiment herein.

FIG. 3A is a flow diagram of a process 300 for generating and displaying color information about the object 50 undergoing a 3D scan according to an example embodiment herein. The process begins in Step S302.

If the object 50 undergoing the 3D scan does not have sufficient contrast, it can be difficult to obtain high quality 3D image data corresponding to the object 50. To provide the object with sufficient contrast, where deemed necessary, an optical contrast powder can be applied to the object 50 in Step S304.

That is, in an embodiment where an optical contrast powder is applied to object 50 to provide sufficient contrast for obtaining corresponding 3D image data, Step S304 is performed. In Step S304, optical contrast powder is applied to object 50, and, more particularly, a dental professional brushes or sprays the optical contrast powder onto the object 50. In other embodiments where an optical contrast powder is not applied to object 50, Step S304 is not performed.

The optical contrast powder applied in Step S304 can be made up of white, black, or black and white particles, for example. In another example embodiment herein, the optical contrast powder can be made up of a plurality of colored particles. When the optical contrast powder is made up of particles of more than one color (e.g., black and white), it is desirable that the particles of each color absorb different amounts of a particular color of light (e.g., white). Also when the optical contrast powder is made up of particles of (e.g., black and white), in one example embodiment herein, it is desirable that color images of each particle look similar regardless of the color (i.e., red, blue, or green) of the color filter that light passes through to image the particle. It also can be useful for the particles of the optical contrast powder to not completely obscure the surface of the object 50, so that colors of the object 50 can be captured by the camera unit 140. One example of an optical contrast powder that can be applied to the object 50 in Step S304 is disclosed in U.S. Patent Application Publication No. 2013/0244199, entitled "Contrast Pattern Application For Three-Dimensional Imaging," by Lu et al., which is incorporated by reference herein in its entirety, as if set forth fully herein.

The 3D scanning system 100 can utilize the optical contrast powder to obtain accurate 3D data and to provide reference points so that the 3D scanning system 100 can compensate for motion of the camera unit 140 as the handpiece 102 is moved to scan the object 50. It can be useful for the particles of the optical contrast powder to not completely obscure the object 50 when the 3D scanning system 100 scans the object 50. When the object 50 is not completely covered by the particles of the optical contrast powder, information regarding the color(s) of the object 50 can be captured by the 3D scanning system 100. Additionally, the 3D scanning system 100 can use the particles of the optical contrast powder as reference markers to correlate 2D image data generated by the first portion 142 of color pixel sensor array 148 with 2D image data generated by the second portion 144 of the color pixel sensor array 148 to generate 3D data in Step S322, as will be explained below.

In Step S306, the object 50 is illuminated with light 119 and the camera unit 140 captures at least one image. For example, the computer system 104 sends signals to the handpiece 102 via the cable 106, which cause the camera unit 140 to capture an image while simultaneously causing the drive circuit 146 to control the illumination unit 116 to strobe output light 119 (at a predetermined strobe rate, e.g., the frame rate) to illuminate object 50. As a result of the object 50 being illuminated with light 119 (e.g., any of the types of light described above), light 121 reflected back into the handpiece 102 is forwarded via elements 122, 124, 130, 136, and 138 and is captured by the first portion 142 and the second portion 144 of the camera unit 140, as described above. (A plurality of images may be captured (at respective times) in Step S306 in the foregoing manner.)

More particularly, according to an example embodiment where the light 119 is white light, the illumination unit 116 includes the LEDs 118 and 120, each of which emit white light, and the computer system 104, under control of the drive circuit 146, causes the LEDs 118 and 120 to strobe white light at a predetermined strobe rate (e.g., the frame rate). Of course, as described above, the illumination unit 116 can include LED arrangements other than two white light-emitting LEDs.

In a case where the object 50 is deemed not to have sufficient contrast (thereby making it difficult to obtain 3D image data corresponding to object 50) and where no optical contrast powder is applied in Step S304, Step S306 can be performed by the illumination unit 116 projecting the light 119 such that the light is structured light, the structured light having contrast enhancing features such as, for example, a random dot pattern, a dark and light stripe pattern, or a colored stripe pattern. The contrast enhancing features of the structured light provide, similarly to the optical contrast powder, reference points so that the 3D scanning system 100 can employ them to compensate for motion of the camera unit 140, and, as will be described below with respect to Step S322, correlate 2D image data generated by the first portion 142 of the color pixel sensor array 148 with 2D image data generated by the second portion 144 of the color pixel sensor array 148 to generate 3D data.

In still another embodiment herein, optical contrast powder is applied in Step S304 and illumination unit 116 projects structured light as light 119 on to object 50 in Step S306.

Figure 4A:
FIG. 4A illustrates an example color filter array of the color pixel sensor array shown in FIG. 1B.

In Step S308, the camera unit 140 of the 3D scanning system 100 generates 2D color image data corresponding to the object 50 based on light captured by the first portion 142 and the second portion 144 of the camera unit 140 in Step S306. FIG. 4A illustrates an example representation of a color filter array 400 that, in one example embodiment herein, can be used for each of the first portion 142 and second portion 144 of the color filter array 150 of the color pixel sensor array 148 of the camera unit 140. The color filter array 400 includes a plurality of color filters CF1 to CF64 arranged according to the Bayer pattern. For illustrative simplicity, the example color filter array 400 includes only 64 color filters; however, any suitable number of color filters could be used without departing from the scope of the present disclosure.

Figure 4B:
FIG. 4B illustrates the colors used in the color filter array shown in FIG. 4A.

FIG. 4B illustrates an example representation of colors used in the color filter array 400 shown in FIG. 4A. Each color filter labeled "R" is a red color filter; each color filter labeled "G" is a green color filter; and each color filter labeled "B" is a blue color filter.

Figure 5A:
FIG. 5A illustrates an example pixel sensor array of the color pixel sensor array shown in FIG. 1B.

FIG. 5A illustrates an example representation of a pixel sensor array 500 that, in one example embodiment herein, can be used for each of the first portion 142 and the second portion 144 of the pixel sensor array 152 of the color pixel sensor array 148. The pixel sensor array 500 includes a plurality of pixels P1 to P64. For illustrative simplicity, the pixel sensor array 500 includes an 8-by-8 array of pixels, totaling only 64 pixels; however, any suitable number of pixels could be used without departing from the scope of the present disclosure. In other example embodiments, other pixel sensor array configurations can be employed instead, so that the pixel sensor array 148 in each of the first portion 142 and the second portion 144 includes, for example, a 3840-by-2748 array of pixels, or a 3840-by-2748 array of pixels that can operate in a binning mode and thus operate effectively as a 1920-by-1374 resolution array of pixels, or some other array configuration.

The color filter array 400 is arranged in front of the pixel sensor array 500 to form a color pixel sensor array (not shown) such that light passing through the color filter CF1 illuminates the pixel P1, light passing through the color filter CF2 illuminates the pixel P2, etc. The pixels P1, P2, etc. of the pixel sensor array 500 respond to the illuminating light by outputting color pixel values, which are stored in the following manner.

Figure 5B:
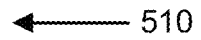
FIG. 5B illustrates an example visual representation of a color pixel value storage array corresponding to the pixel sensor array shown in FIG. 5A.

FIG. 5B illustrates an example representation of a color pixel value storage array 510 that, in one example embodiment herein, is used to store values corresponding to the signals output by the pixel sensor array 500 shown in FIG. 5A. The computer system 104 can store a plurality of color pixel value storage arrays 510 in the main memory 232 and/or the secondary memory 234, for example.

The color pixel value storage array 510 includes color pixel values CPV1 to CPV64. The color pixel value CPV1 is a value of a signal output by the pixel P1 of pixel sensor array 500, the color pixel value CPV2 is a value of a signal output by the pixel P2 of pixel sensor array 500, etc. In one example embodiment, the data structure of the color pixel values can be an 8-bit array in RGB format (that is, each color pixel value can be stored in an 8-bit array in RGB format), or in another example embodiment, a 12-bit array in RGB format, or another configuration.

A plurality of color pixel value storage arrays 510 are used to store the color pixel values CPV1 to CPV64 for each of a plurality of frames of image data acquired by the camera unit 140.

Figure 9:
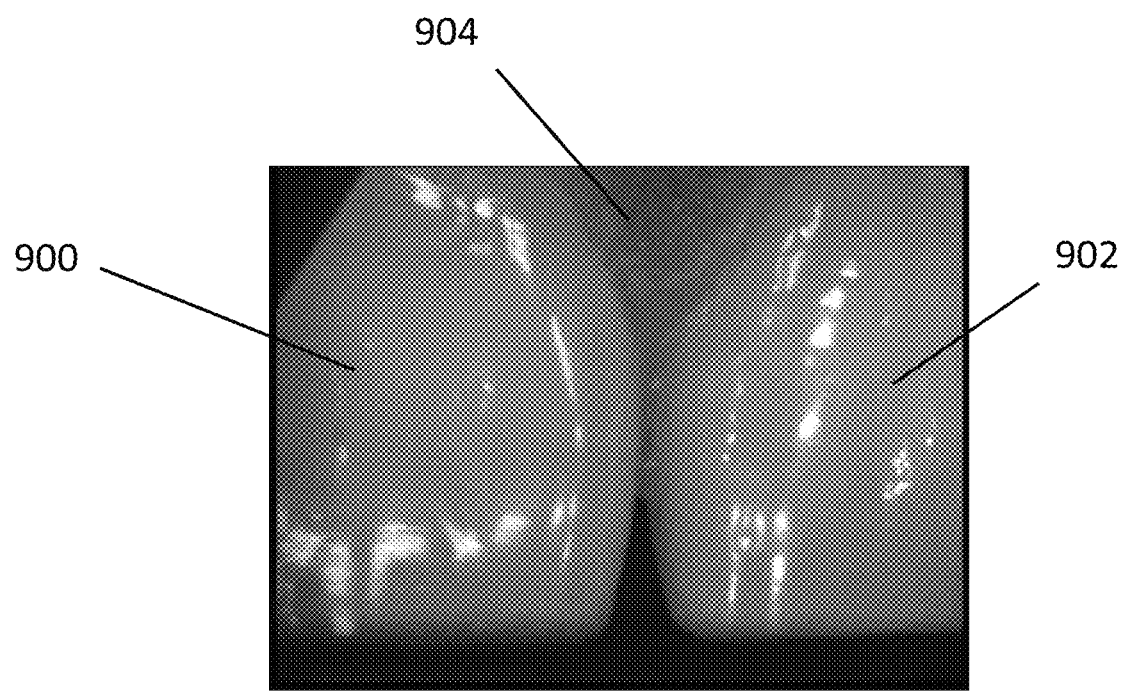
FIG. 9 illustrates an example 2D color image generated by the 3D scanning system of FIG. 1A.

FIG. 9 illustrates an example 2D color image generated by the camera unit 140 of the 3D scanning system 100 and stored in a color pixel value storage array 510 according to Step S308, where teeth 900 and 902 are bone-white in color and a gum portion 904 is pink in color.

In Step S308, the computer system 104 uses a plurality of color pixel value storage arrays 510 to store, in, for example, main memory 232 and/or secondary memory 234, color pixel values for a plurality of frames of image data acquired by the first portion 144 and the second portion 142 of the camera unit 140 in Step S306. With a uniform frequency or at regular intervals of time, the camera unit 140 outputs signals from the first portion 142 and the second portion 144 of the color pixel sensor array 148 to the computer system 104 via the cable 106. The frequency (also known as the frame rate) can be, for example, in the range of 5 to 90 Hz, although these examples are non-limiting. At each interval of time, the computer system 104 stores values corresponding to the signals received from the camera unit 140 as frames of image data (in color pixel value storage arrays 510, which may be stored, for example, in main memory 232 and/or secondary memory 242), wherein each frame of image data includes timestamp or sequence number information indicating a time when the signals were output by the camera unit 140 (or received by the computer system 104) or a relative order of the frames, a sensor identifier indicating the portion of the color pixel sensor array 148 (e.g., the first portion 142 or the second portion 144) that provided the signals, and an identifier of the corresponding color pixel value storage array 510.

In cases when the first portion 142 and second portion 144 are of a sufficiently high resolution, it can be useful to downsample the 2D color image data output by the first portion 142 and the second portion 144 prior to performing additional processing. In one example embodiment, high resolution 2D color image data having a 1920-by-1374 array of color pixel values can be downsampled to lower resolution 2D image color data having a 960-by-687 array of color pixel values.

When downsampling is desired, the computer system 104 downsamples (in Step S310) the 2D color image data generated from signals provided by the first portion 142 and the second portion 144 in Step S308. Downsampling of color pixels values according to an example embodiment herein will be explained with reference to FIGS. 5B to 7B, described below.

As discussed above, FIG. 5B illustrates an example representation of a color pixel value storage array 510, wherein the computer system 104 uses a plurality of color pixel value storage arrays 510, within frames of color image data, to store values of signals generated by the first portion 142 and the second portion 144 in main memory 232 and/or secondary memory 234.

Figure 6A:
FIG. 6A illustrates an example virtual color filter array of the 3D scanning system shown in FIG. 1A.

Referring to FIG. 6A, that drawing illustrates an example representation of a virtual color filter array 600 that is used herein to conceptually explain the downsampling process performed by the computer 104 in Step S310. The virtual color filter array 600 includes a plurality of color filters CF1 to CF16 arranged according to the Bayer pattern. For illustrative simplicity, the example color filter array 600 includes only 16 color filters; however, any suitable number of color filters could be used without departing from the scope of the present disclosure.

Figure 6B:
FIG. 6B illustrates the colors used in the virtual color filter array shown in FIG. 6A.

FIG. 6B illustrates an example of colors used in corresponding locations of the virtual color filter array 600 shown in FIG. 6A. Each color filter labeled "R" is a red color filter; each color filter labeled "G" is a green color filter; and each color filter labeled "B" is a blue color filter.

Figure 7A:
FIG. 7A illustrates an example virtual color pixel sensor array of the 3D scanning system shown in FIG. 1A.

FIG. 7A illustrates an example representation of a virtual color pixel sensor array 700 that is used herein to conceptually explain the downsampling process performed by the computer 104 in Step S310. The virtual color pixel sensor array 700 includes a plurality of pixels P1 to P16. For illustrative simplicity, the color pixel sensor array 700 includes only 16 pixels; however, any suitable number of pixels could be used without departing from the scope of the present disclosure. The color filters CF1 to CF16 of the color filter array 600 described above respectively correspond to pixels P1 to P16 of the virtual color pixel sensor array 700.

Figure 7B:
FIG. 7B illustrates an example visual representation of a color pixel value storage array corresponding to the virtual color pixel sensor array shown in FIG. 7A.

FIG. 7B illustrates an example representation of a color pixel value storage array 710 used to store values corresponding to the pixels of the virtual color pixel sensor array 700 shown in FIG. 7A. The color pixel value storage array 710 includes color pixel values CPV1 to CPV16. The color pixel values CPV1 to CPV16 of the color pixel value storage array 710 respectively correspond to pixels P1 to P16 of the virtual color pixel sensor array 700. While FIGS. 6A, 6B, and 7A illustrate example representations of a virtual color filter array 600, colors of a virtual color filter array 600, and a virtual color pixel sensor array 700, respectively, for the purposes of conceptually explaining the downsampling process of Step S310, the color pixel value storage array 710 shown in FIG. 7B illustrates an example of a real data structure for storing the output of the downsampling process of Step S310, as will be described further below.

In Step S310, the computer system 104 uses a plurality of color pixel value storage arrays 710 to store downsampled color pixel values CPV1 to CPV16 for a plurality of frames of color image data stored by the computer system 104. The computer system 104 can store the plurality of color pixel value storage arrays 710 in the main memory 232 and/or the secondary memory 234 of the computer system 200, for example. In one example embodiment, the data structure of each color pixel value can be an array in YUV format, which often has a smaller array size than that of a color pixel value stored in RGB format.

In the following example, assume that the color filters CF1 to CF16 shown in FIG. 6A respectively correspond to the pixels P1 to P16 shown in FIG. 7A. Additionally, assume that the pixels P1 to P16 shown in FIG. 7A respectively correspond to the color pixel values CPV1 to CPV16 shown in FIG. 7B.

In addition, the phrase "red pixel value" will be used to refer to a color pixel value shown in FIG. 5B that corresponds to a pixel shown in FIG. 5A that is illuminated by light that has passed through a red color filter shown in FIG. 4B. The phrase "green pixel value" will be used to refer to a color pixel value shown in FIG. 5B that corresponds to a pixel shown in FIG. 5A that is illuminated by light that has passed through a green color filter shown in FIG. 4B. The phrase "blue pixel value" will be used to refer to a color pixel value shown in FIG. 5B that corresponds to a pixel shown in FIG. 5A that is illuminated by light that has passed through a blue color filter shown in FIG. 4B.

The computer system 104 calculates averages of the color pixel values stored in a color pixel value storage array 510 and stores the calculated averages in color pixel value storage array 710. According to an example embodiment herein, the computer system 104 calculates averages within groups of sixteen of the color pixel values included in the color pixel value storage array 510 and stores the calculated averages in a color pixel value storage array 710. More particularly, the computer system 104 calculates an average of four red pixel values included in each group of sixteen color pixel values of the color pixel value storage array 510 and stores the calculated average in a red pixel value of the corresponding group of four color pixel values in the color pixel value storage array 710. Additionally, the computer system 104 calculates an average of eight green pixel values included in each group of sixteen color pixel values of the color pixel value storage array 510 and stores the calculated average in two green pixel values of the corresponding group of four color pixel values in the color pixel value storage array 710. In addition, the computer system 104 calculates an average of four blue pixel values included in each group of sixteen color pixel values of the color pixel value storage array 510 and stores the calculated average in a blue pixel value of the corresponding group of four color pixel values in the color pixel value storage array 710.

An example of the process for downsampling one group of sixteen color pixel values of the color pixel value storage array 510 to one group of four color pixel values in the color pixel value storage array 710 will be explained with reference to FIGS. 5B and 7B. The computer system 104 calculates an average of the red color pixel values CPV1, CPV3, CPV17, and CPV19 in the color pixel value storage array 510 and stores the average in the red color pixel value CPV1 of the color pixel value storage array 710. The computer system 104 also calculates an average of the green color pixel values CPV2, CPV4, CPV9, CPV11, CPV18, CPV20, CPV25, and CPV27 in the color pixel value storage array 510 and stores the average in the green color pixel values CPV2 and CPV5 of the color pixel value storage array 710. Additionally, the computer system 104 calculates an average of the blue color pixel values CPV10, CPV12, CPV26, and CPV28 in the color pixel value storage array 510 and stores the average in the blue color pixel value CPV6 of color pixel value storage array 710. The computer system 104 then repeats a similar downsampling process for every other group of sixteen color pixel values in the color pixel value storage array 510. After downsampling is performed in Step S310, fine 2D color image data from the first and second portions 142 and 144 that is stored in the color pixel value storage array 510 is converted to coarse 2D color image data that is stored in the color pixel value storage array 710.

One advantage of the above downsampling process is that, because the pixels of the pixel sensor array 500 (which in at least one example are used for the first and second portions 142 and 144 shown in FIGS. 1A and 1B) are uniformly spaced in each area, the downsampled color image data not only preserves the color information but also minimizes image information loss in each area. In other example embodiments, no downsampling (Step S310) is performed, in which case control passes directly from Step S308 to Steps S312 and S320 (and 2D color image data generated in Step S308 is provided by Step S312 to the color calculation performed in Step S314, as will be described below).

In Step S312, the computer system 104 provides color information to the color calculation step (Step S314). For example, if downsampling was performed in Step S310, the color information includes the downsampled 2D color image data generated in Step S310. If no downsampling was performed (i.e., if Step S310 was not performed), the color information provided in Step S312 includes the 2D color image data generated in Step S308.

In Step S314, the computer system 104 performs color calculations using the color information provided in Step S312 to generate calculated color information. In one example embodiment, the calculated color information is generated in Step S314 by converting mosaic color pixel information to true color information using, for example, known demosaicing techniques.

In a further example embodiment herein, Step S314 may additionally include a substep for performing a color correction of the calculated color information as follows. For example, in the case where an optical contrast powder is applied to object 50 in Step S304, particles of the optical contrast powder obscure the portions of object 50 on which they are applied. Thus, at least some pixels of the calculated color information generated as described above in Step S314 correspond to light reflected, at least in part, from a contrast powder particle coating the object 50. Such pixels may not accurately represent the color of the object 50 and are therefore deemed affected pixels. To perform the color correction, the computer system 104 first identifies the affected pixels by, for example, statistically analyzing the color distribution of neighborhoods of pixels of the calculated color information (a neighborhood may be defined as, for example, an n-by-m subset of pixels). For example, low and high pixel values among a neighborhood of pixels may correspond to pixels affected by black and white contrast powder particles, respectively, where such particles are used. Once the affected pixels have been identified, the computer system 104 replaces the pixel value of an affected pixel (for each affected pixel) with the pixel value of at least one neighboring pixel that does not correspond to light reflected from an optical contrast powder particle (i.e., a non-affected pixel). In another example embodiment herein, the pixel value of the affected pixel may be replaced by a statistical representation of neighboring pixels, such as, for example, the median pixel value of neighboring pixels. In at least some cases, calculated color information corrected in the foregoing manner may more accurately represent the appearance of the object 50.

After Step S314, control passes to Step S324, which will be described below. Before describing that step, Steps S320 and S322 will first be described. Like Step S312, Step S320 is performed after Step S310 is performed, or after Step S308 is performed in the case where Step S310 is not performed.

Figure 8:
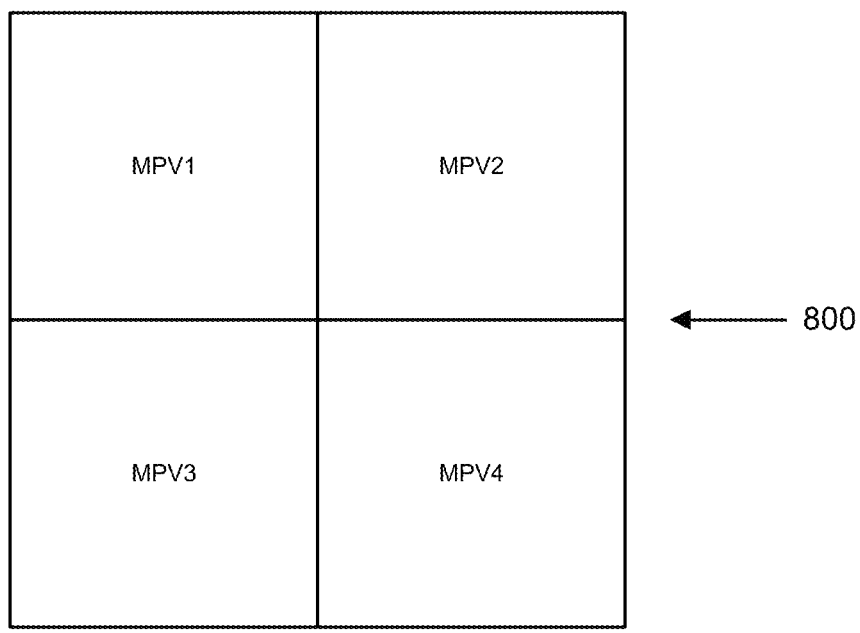
FIG. 8 illustrates an example visual representation of a monochrome pixel value storage array according to an example embodiment herein.

In Step S320, the downsampled 2D color image data generated in Step S310 (or the 2D color image data generated in Step S308, if Step S310 is not performed) are converted to 2D monochrome image data according to at least one example embodiment described herein below. FIG. 8 illustrates an example representation of a monochrome pixel value storage array 800 that the computer system 104 can use to store monochrome pixel values in, for example, the main memory 232 and/or the secondary memory 234 for each frame of color image data acquired by the camera unit 140. As will be explained below, the computer system 104 processes 2D monochrome image data stored in a plurality of monochrome pixel value storage arrays 800 to generate corresponding 3D data. In one example embodiment, the data structure of each monochrome pixel value can be an 8-bit array, or in another example embodiment, a 12-bit array.

According to one example embodiment herein (hereinafter also referred to as a "weighted average calculation", for convenience), the computer system 104 performs Step S320 by calculating weighted averages of the color pixel values stored in the color pixel value storage array 710 to generate monochrome pixel values that are then stored in a corresponding monochrome pixel value storage array 800. More particularly, in one example, the computer system 104 calculates weighted averages of predetermined groups of neighboring color pixel values stored in the color pixel value storage array 710 generated in Step S310 (or Step S308, if Step S310 is not performed) to generate monochrome pixel values that are stored in a corresponding monochrome pixel value storage array 800 shown in FIG. 8. Each monochrome pixel value is stored at a location in the monochrome pixel value storage array 800 corresponding to the location of the group of neighboring color pixel values in color pixel value storage array 710 from which the monochrome pixel value is calculated. In one example embodiment herein, each group of neighboring color pixel values includes the same ratio of red color pixel values, green color pixel values, and blue color pixel values.

For example, the computer system 104 calculates a weighted average of the neighboring color pixel values corresponding to the upper-left corner of the color pixel value storage array 710 (i.e., CPV1, CPV2, CPV5, and CPV6) and stores the weighted average in the upper-left corner (i.e., MPV1) of a corresponding monochrome pixel value storage array 800. Additionally, the computer system 104 calculates a weighted average of the neighboring color pixel values corresponding to the upper-right corner of the color pixel value storage array 710 (i.e., CPV3, CPV4, CPV7, and CPV8) and stores the weighted average in the upper-right corner (i.e., MPV2) of the corresponding monochrome pixel value storage array 800. Also, the computer system 104 calculates a weighted average of the neighboring color pixel values corresponding to the lower-left corner of the color pixel value storage array 710 (i.e., CPV9, CPV10, CPV13, and CPV14) and stores the weighted average in the lower-left corner (i.e., MPV3) of the corresponding monochrome pixel value storage array 800. In addition, the computer system 104 calculates a weighted average of the neighboring color pixel values corresponding to the lower-right corner of the color pixel value storage array 710 (i.e., CPV11, CPV12, CPV15, and CPV16) and stores the weighted average in the lower-right corner (i.e., MPV4) of the corresponding monochrome pixel value storage array 800. Each of the foregoing groups of neighboring color pixel values include four color pixel values in the same ratio according to color: one red color pixel value, two green color pixel values, and one blue color pixel value, although this example is not limiting.

More particularly, the computer system 104 calculates the weighted averages of the neighboring color pixel values according to the present embodiment such that red color pixel values, green color pixel values, and blue color pixel values contribute equally to the corresponding monochrome pixel value. For example, the weighted average of color pixel values corresponding to the upper-left corner of the pixel value storage array 710 can be calculated as the sum of one-third of the red color pixel value CPV1, one-third of the average of the two green color pixel values CPV2 and CPV5, and one-third of the blue color pixel value CPV6 (i.e., ($\frac{1}{3}$*CPV1+$\frac{1}{3}$*((CPV2+CPV5)/2)+$\frac{1}{3}$*CPV6).

In another example embodiment herein, instead of performing the weighted average calculation described above for Step S320, the computer system 104 performs Step S320 by applying a contrast-enhancing monochrome conversion algorithm to the downsampled 2D color image data generated in Step S310 and stored, for example, in color pixel value storage array 710 (or the 2D color image data generated in Step S308 and stored, for example, in color pixel value storage array 510, if Step S310 is not performed) to generate monochrome pixel values that are stored in a corresponding monochrome pixel value storage array 800. The contrast-enhancing monochrome conversion algorithm takes into account chromatic differences in the downsampled 2D color image data (stored in color pixel value storage array 710) in order to generate high contrast 2D monochrome image data (and store it in monochrome pixel value storage array 800), where the chromatic differences would otherwise be unused in the above-described embodiment using the weighted average calculation. Example contrast-enhancing monochrome conversion algorithms that may be used in this embodiment of Step S320 are described in the publication by M. Grundland et al., entitled "Decolorize: Fast, contrast enhancing, color to grayscale conversion," Pattern Recognition, Volume 40, Issue 11, 2007, pp. 2891-2896, and the publication by M. Qiu et al., entitled "Contrast Maximizing and Brightness Preserving Color to Grayscale Image Conversion," CGIV2008, 4th European Conference on Colour in Graphics, Imaging, and Vision, Final Program and Proceedings, 2008, pp. 347-351, which are incorporated by reference herein in their entireties, as if set forth fully herein.

More particularly, in this embodiment the computer system 104 performs Step S320 in one example embodiment by applying the contrast-enhancing monochrome conversion algorithm, as described above, on each frame of 2D color image data generated in Step S310 by each of the first portion 142 and second portion 144 of the color pixel sensor array 148 to generate a corresponding frame of high contrast 2D monochrome image data.

In still another example embodiment herein (and instead of performing the contrast-enhancing monochrome conversion algorithm for Step S320 on each frame of 2D color image data in the foregoing manner), the computer system 104 applies the contrast-enhancing monochrome conversion algorithm on a pre-determined training data set of 2D color image data to generate a standard contrast enhancement transform function at some time prior to Step S320. The pre-determined training set of data may be, for example, a 2D color image data previously captured by camera 140 or a user-designed, artificially generated 2D color image data. Then, in Step S320, each frame of 2D color image data generated in Step S310 by each of the first portion 142 and second portion 144 of the color pixel sensor array 148 is converted to a frame of 2D monochrome image data by the above-described weighted average calculation, and the standard contrast enhancement transform function is applied to each frame of 2D monochrome image data to generate a corresponding frame of high contrast 2D monochrome image data. By virtue of applying the contrast-enhancing monochrome conversion algorithm on a pre-determined training data set of 2D color image data prior to Step S320, high contrast 2D monochrome image data may be generated in Step S320 in a less computationally intensive manner than by applying the contrast-enhancing monochrome conversion algorithm to each frame of 2D color image data during Step S320 as described above.

According to yet another example embodiment herein, instead of performing either the weighted average calculation or the contrast-enhancing monochrome conversion algorithm for Step S320 as described above, the computer system 104 performs a color reduction process to generate 2D monochrome image data in Step S320 by selecting color pixel values of the downsampled 2D color image data from Step S310 (or the 2D color image data from Step S308, if Step S310 is not performed) that correspond to one color filter type (e.g., red, green, or blue) to generate 2D monochrome image data.

In particular, one method of performing the color reduction process includes selecting only the red color pixel values of the downsampled 2D color image data from Step S310 and storing those red color pixel values in a corresponding location in the 2D monochrome image data. For example, 2D monochrome image data can be derived in the preceding manner from downsampled 2D color data of Step S310 stored in the color pixel value storage array 710 by storing the red color pixel value CPV1 of the color pixel value storage array 710 in MPV1 of the monochrome pixel value storage array 800, storing the red color pixel value CPV3 of the color pixel value storage array 710 in MPV2 of the monochrome pixel value storage array 800, storing the red color pixel value CPV9 of the color pixel value storage array 710 in MPV3 of the monochrome pixel value storage array 800, and storing the red color pixel value CPV11 of the color pixel value storage array 710 in MPV4 of the monochrome pixel value storage array 800, although this example is non-limiting. Similarly, 2D monochrome image data also could be derived by selecting only the green color pixel values or the blue color pixel values, in a similar manner.

Step S322 will now be described. In Step S322, the 3D scanning system 100 uses the 2D monochrome image data generated in Step S320 to generate corresponding 3D data. The data structure of the 3D data may be a point cloud, that is, a set of coordinates in 3D space, or a 3D polygonal mesh, although these examples are non-limiting. In the case where downsampling is performed in Step S310, then in Step S322, for each instance of time that the camera unit 140 generates the 2D color image data in Step S308, the computer system 104 uses (a) data included in a monochrome pixel value storage array 800 generated in Step S320 corresponding to a downsampled frame of image data generated in Step S310 for the first portion 142 of the color pixel sensor array 148 and (b) data included in a monochrome pixel value storage array 800 generated in Step S320 corresponding to a downsampled frame of image data generated in Step S310 for the second portion 144 of the color pixel sensor array 148, to generate a corresponding frame of 3D data. In a case where downsampling is not performed in Step S310, then in Step S322, for each instance of time that the camera unit 140 generates the 2D color image data in Step S308, the computer system 104 uses (a) data included in a monochrome pixel value storage array 800 generated in Step S320 corresponding to a frame of image data generated in Step S308 by the first portion 142 of the color pixel sensor array 148 and (b) data included in a monochrome pixel value storage array 800 generated in Step S320 corresponding to a frame of image data generated in Step S308 by the second portion 144 of the color pixel sensor array 148, to generate a corresponding frame of 3D data.

For example, in Step S322, the computer system 104 can generate the 3D data by performing known stereo correspondence matching methods such as defocusing, stereoscopic, cross-correlation, Scale Invariant Feature Transform (SIFT), and Speeded Up Robust Feature (SURF) techniques on pairs of frames of 2D monochrome image data. In one example, the stereo correspondence matching methods generate 3D data by identifying and correlating corresponding features in pairs of frames of 2D monochrome image data, where such corresponding features may be provided, where applicable, by at least one of the optical contrast powder applied to object 50 in Step S304, the features of structured light projected on to object 50 by illumination unit 116 in Step S306, and predetermined features in the captured images (where the predetermined features represent features of object 50). One example of deriving 3D data from two 2D images is disclosed in WO 2012/030357, entitled "Three-Dimensional Imaging System," by Gharib et al., which is incorporated by reference herein in its entirety.

Step S324 will now be described. In Step S324, the computer system 104 generates 3D color image data by combining various types of color information derived from the 2D color image data (e.g., calculated color information, or, more particularly, true color information generated in Step S314) and the 3D data generated in Step S322. For example, the computer system 104 can generate 3D color image data of the object 50 by employing one or more mapping methods, such as, for example, the mapping method described in the publication by P. Shirley, entitled "Fundamentals of Computer Graphics," A K Peters/CRC Press, 2009, pp. 252-253, which is incorporated by reference herein in its entirety, as if set forth fully herein. According to this example embodiment, the computer system 104 first associates the calculated color information generated in Step S314 with a coordinate system, such as (u,v), to create a color information texture map. The computer system 104 also unwraps the 3D data generated in Step S322 to create a 2D polygon mesh having vertices, edges, and faces. The computer system 104 then aligns the 2D polygon mesh on the texture map and assigns (u,v) coordinates to vertices of the mesh. The 2D polygon mesh with assigned (u,v) coordinates is then reassembled into an untextured 3D model, and the 3D color image data is created by overlaying pixels of the color information texture map on the untextured 3D model based on the (u,v) coordinates assigned to the vertices of the model. Of course, other suitable types of mapping can be employed instead.

Figure 10:
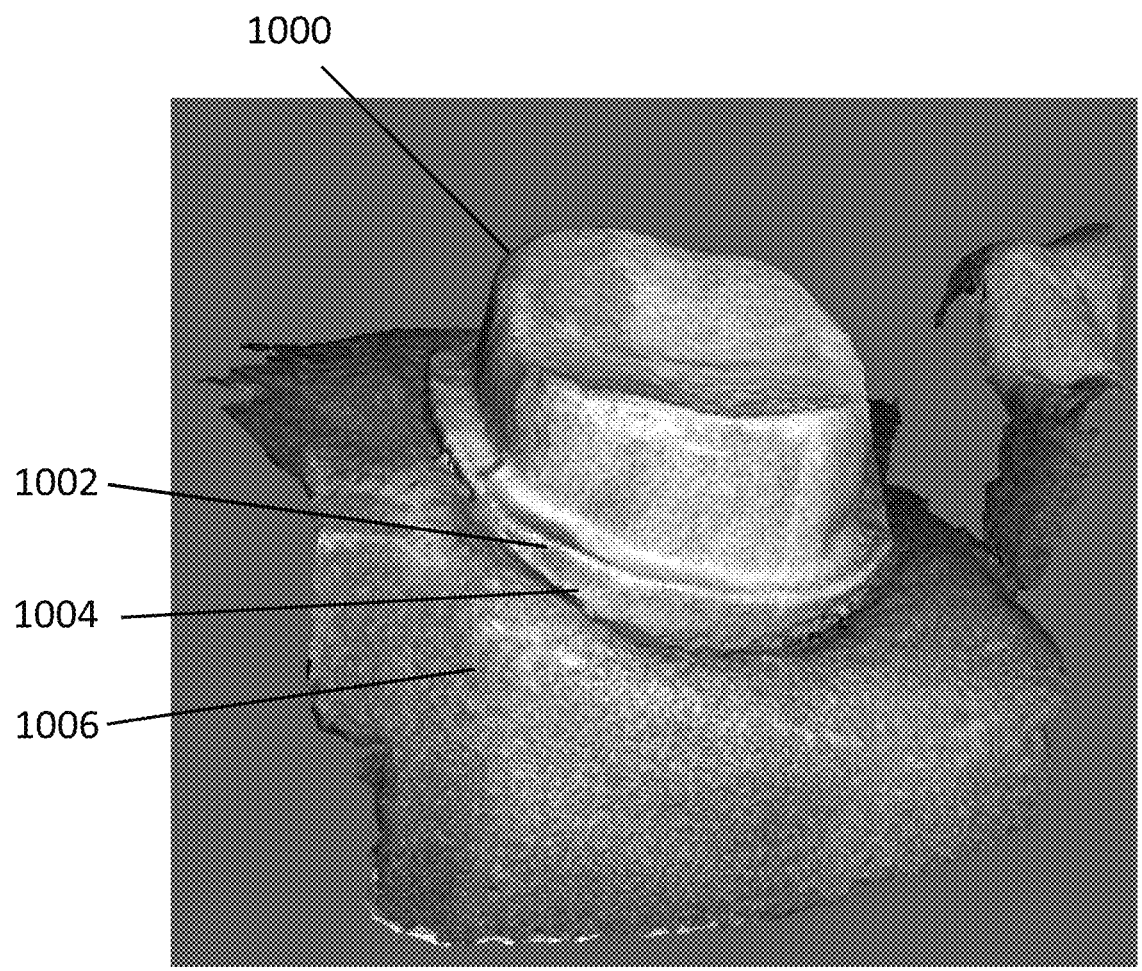
FIG. 10 illustrates an example 3D color image data displayed by the 3D scanning system of FIG. 1A.

In Step S326, the 3D scanning system 100 displays the 3D color image data generated in Step S324 on the display unit 108. FIG. 10 illustrates one example of 3D color image data displayed by the 3D scanning system 100 on the display unit 108 according to Step S326, where a ground-down portion 1000 of a tooth, a margin 1002, and an untouched portion 1004 of the tooth are bone-white in color, and a gum portion 1006 is pink in color.

The process 300 ends in Step S328. As can be appreciated, in view of the foregoing, by virtue of capturing images and processing them using the procedure 300 described above, 3D color image data can be presented to an operator.

Accordingly, the 3D scanning system 100 can capture and display color information in real time as a color video from the perspective of the camera unit 140 for assisting dental professionals to distinguish between clinically relevant areas and unnecessary areas. For example, the real time color video provided by the 3D scanning system 100 can assist dental professionals in distinguishing the teeth and the gum of a patient from other anatomies such as the tongue and the cheek. Additionally, the real time color video provided by the 3D scanning system 100 can assist dental professionals in identifying a clinically relevant margin between a ground-down portion of a tooth and an untouched portion of the tooth, thus facilitating optimal preparation and placement of a dental crown relative to the margin. Moreover, the 3D scanning system 100 can render color information of an object 50 being scanned in three-dimensions for providing vivid and realistic visual feedback to dental professionals performing 3D scans and make the scanning process easier. Furthermore, the 3D scanning system 100 is capable of producing a precise 3D model by virtue of at least Step S320, which reduces the color information and thus also imprecisions arising from chromatic aberration and optical diffraction, of the data upon which the 3D model is generated.

In another example embodiment herein, the 3D scanning system 100 includes a plurality of modes of operation, including, but not limited to, the 3D scan mode described above in process 300 with reference to FIG. 3A, a 2D imaging mode, and a 3D scan mode optimized for 2D image recording. In one example embodiment herein, the 3D scanning system 100 is operable to switch between the modes of operation, and more particularly, to switch between modes of operation in real-time. The 3D scanning system 100 may be switched between modes of operation either by user control (e.g., via input unit 230 shown in FIG. 2 or switch 154 shown in FIG. 1A) or under automatic control of computer system 104. For example, an operator can enter information into the input unit 230 specifying that the system 1 operate in one of those modes, in which case the system 1 responds by operating in the specified mode. The other modes of operation can be selected in a similar manner.

Figure 3B:
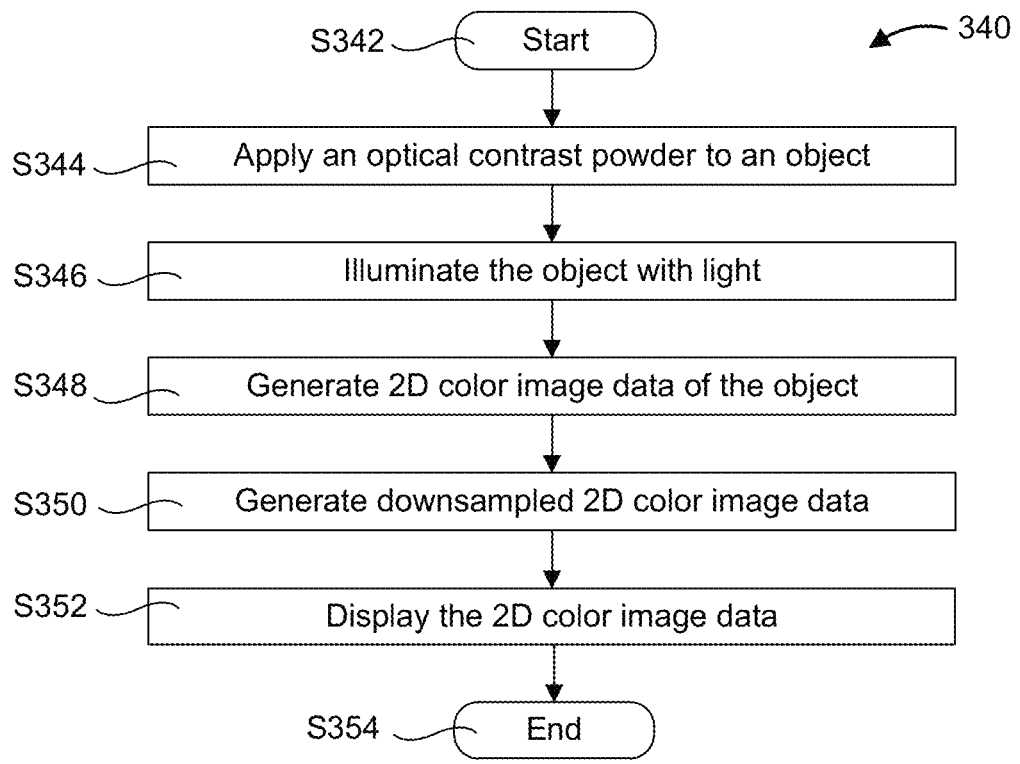
FIG. 3B is a flow diagram of an example process for generating and displaying a two-dimensional (2D) color image of an object according to an example embodiment herein.

The 2D imaging mode of the plurality of modes of operation collects and displays a 2D representation (i.e., a picture) of object 50 using the 3D scanning system 100 (illustrated in FIG. 1A) according to the flow diagram illustrated in FIG. 3B, in one example embodiment herein. The 2D scan mode process 340 begins in Step S342.

In Step S344, an optical contrast powder is applied to the object 50 in a manner substantially similar to that described above with respect to Step S304. (Of course, this step need not be performed if it already was performed, such as for the 3D scan mode). In another example embodiment herein, Step S344 is not performed, that is, an optical contrast powder is not applied to the object 50, and instead, control passes from Step S342 directly to Step S346.

In Step S346, the object 50 is illuminated with light 119 in a manner substantially similar to that described above with respect to Step S306.

In Step S348, 2D color image data of the object 50 is generated in a manner substantially similar to that described above with respect to Step S308.

In Step S350, the 2D color image data generated in Step S348 is downsampled to generate a downsampled 2D color image data in a manner substantially similar to that described above with respect to Step S310. In another example embodiment herein, Step S350 is not performed, that is, the 2D color image data is not downsampled, and instead, control passes from Step S348 to S352 directly.

In Step S352, the 3D scanning system 100 displays the downsampled 2D color image data generated in Step S350 (or the 2D color image data generated in Step S348, if Step S350 was not performed) on the display unit 108. The 2D scan mode process 340 ends in Step S354.

The 3D scan mode optimized for 2D image recording of the plurality of modes of operation will now be described. The 3D scan mode optimized for 2D image recording is performed in a manner similar to the 3D scan mode described above in process 300 of FIG. 3A to generate and display 3D color image data, but includes differences in certain algorithms and steps of process 300, such that a 3D accuracy of the 3D color image data can be lesser (to at least some extent) than that in the 3D scan mode, as a compromise for a shorter time to scan and to generate the 3D color image data and for a more optimized color quality of the 3D color image data.

In particular, in one example where an optical contrast powder is applied in Step S304, a sparser coating is applied relative to that applied in Step S304 of the 3D scan mode. By virtue of applying a sparser coating of optical contrast powder in Step S304 of the present mode, less of object 50 is obscured by the optical contrast powder particles. As a result, the 2D color image data captured and generated by camera 140 in Step S308, the calculated color information generated in Step S314, and the 3D color image data displayed in Step S326, more accurately represent the color of object 50. However, because a sparser coating of optical contrast powder is applied in Step S304 in the present mode of operation, pairs of images used in Step S322 to generate 3D data may have fewer corresponding features available for the stereo correspondence matching method performed in Step S322. To compensate for any such reduced availability of corresponding features in image pairs, the camera unit 140 can be operated at a greater frame rate in Step S308 so as to provide more data for the stereo correspondence matching method performed in Step S322. Accordingly, the LEDs 118 and 120 can be operated in Step S306 such that their strobing is optimized to project light 119 on to object 50 at substantially the increased frame rate of camera unit 140. The stereo correspondence matching method of Step S322 also is performed in a manner optimized to take advantage of the image pairs provided at the higher frame rate to generate 3D data. For example, optimization of the stereo correspondence matching method that is performed in Step S322 can include reparametrizing the matching method as well as adapting quality thresholds that are employed to reject low quality data within the matching method.

As will be appreciated by those of skill in the relevant art(s) in view of this description, the example aspects described herein can be implemented using a single computer or using a computer system that includes multiple computers each programmed with control logic to perform various of the above-described functions.

The various embodiments described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents.

In addition, it should be understood that the attached drawings, which highlight functionality described herein, are presented as illustrative examples. The architecture of the present invention is sufficiently flexible and configurable, such that it can be utilized (and navigated) in ways other than that shown in the drawings.

Moreover, the example embodiments described herein are not limited to 3D dental scanning systems. The example embodiments described herein can be used to perform scans of other anatomical regions.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A method of generating a three-dimensional (3D) image of a dental object, the method comprising:
   projecting, using a first optical component, light that has been reflected by an illuminated dental object and that has passed through a first aperture of a camera, onto a first portion of an image sensor;
   projecting, using a second optical component, light that has been reflected by the illuminated dental object and that has passed through a second aperture of the camera, onto a second portion of the image sensor;
   receiving a first two-dimensional (2D) color image data of the illuminated dental object from the first portion of the image sensor, the first 2D color image data includes a first plurality of color pixel values;
   receiving a second two-dimensional (2D) color image data of the illuminated dental object from the second portion of the image sensor, the second 2D color image data includes a second plurality of color pixel values;
   wherein the first aperture of the camera is different from the second aperture of the camera;
   generating a color information texture map based on the first and second 2D color image data;
   generating first and second 2D monochrome image data respectively corresponding to the first and second 2D color image data by applying a monochrome conversion to the first and second 2D color image data;
   generating 3D data, using particles of an optical contrast powder or contrast enhancing features of structured illumination light as reference markers, to correlate the first 2D monochrome image data with the second 2D monochrome image data;
   generating a 3D model of the illuminated object from the 3D data;
   generating 3D color image data by overlaying pixels of the color information texture map on the 3D model of the illuminated object,
   downsampling the first 2D color image data such that a downsampled first 2D color image data includes a third plurality of color pixel values,
   downsampling the second 2D color image data such that a downsampled second 2D color image data includes a fourth plurality of color pixel values,
   wherein a number of color pixel values in the third plurality of color pixel values is smaller than another number of color pixel values in the first plurality of color pixel values,
   wherein a number of color pixel values in the fourth plurality of color pixel vales is smaller than another number of color pixel values in the second plurality of color pixel values,
   wherein the monochrome conversion is applied to the downsampled first and second 2D color image data in the generating of the first and second 2D monochrome image data.

2. The method of claim 1, further comprising:
   causing a display unit to display the 3D color image data.

3. The method of claim 2, wherein the 3D color image data is displayed on the display unit in real time.

4. The method of claim 1,
   wherein the first 2D color image data includes a first plurality of color pixel values,
   wherein the second 2D color image data includes a second plurality of color pixel values,
   wherein the first 2D monochrome image data includes a first plurality of monochrome pixel values, each of the first plurality of monochrome pixel values is a weighted average value of four color pixel values corresponding to four neighboring pixels of the first 2D color image data, and
   wherein the second 2D monochrome image data includes a second plurality of monochrome pixel values, each of the second plurality of monochrome pixel values is a weighted average value of four color pixel values corresponding to four neighboring pixels of the second 2D color image data.

5. The method of claim 1,
   wherein the first 2D color image data includes a first plurality of color pixel values,
   wherein the first 2D monochrome image data includes pixel values of the first 2D color image data having one color,
   wherein the second 2D color image data includes a second plurality of color pixel values, and wherein the second 2D monochrome image data includes pixel values of the second 2D color image data having one color.

6. The method of claim 5, wherein the one color is blue.

7. The method of claim 1,
wherein each of the third plurality of color pixel values of the downsampled first 2D color image data corresponds to four adjacent pixels and is generated using sixteen color pixel values of the first 2D color image data, and
wherein each of the fourth plurality of color pixel values of the downsampled second 2D color image data corresponds to four adjacent pixels and is generated using sixteen color pixel values of the second 2D color image data
wherein the downsampled first 2D color image and the downsampled second 2D color image are stored in color pixel value storage arrays.

8. The method of claim 1, wherein the optical contrast powder is applied to the dental object.

9. The method of claim 8, wherein the optical contrast powder includes black particles, white particles, or black and white particles.

10. The method of claim 8, wherein the optical contrast powder includes particles of at least two colors.

11. The method of claim 10, wherein particles of a first color of the optical contrast powder absorb a different amount of a color of light than particles of a second color of the optical contrast powder.

12. The method of claim 8, further comprising:
performing color correction on portions of the first and second 2D color image data that correspond to the optical contrast powder.

13. The method of claim 1, wherein the dental object is illuminated with white light.

14. The method of claim 1, wherein the dental object is illuminated with a plurality of colored lights.

15. The method of claim 1, wherein the dental object is illuminated with structured light.

16. The method of claim 1, further comprising:
causing a display unit to display at least one of the first and second 2D color image data.

17. The method of claim 1, wherein the generating of the 3D data includes correlating features in the first and second 2D monochrome image data.

18. The method of claim 17, further comprising:
causing the dental object to be illuminated with light at a predetermined strobe rate; and
performing generating of the first and second 2D color image data at a predetermined frame rate.

19. The method of claim 1, further comprising:
rejecting low quality results of the correlating.

20. The method according to claim 1, further comprising:
generating the 3D data for the same instance of time that first and second portions of the image sensor generate the first and second 2D color images; and,
displaying 3D color image data in real time.

21. A non-transitory computer-readable storage medium storing a program which, when executed by a computer system, causes the computer system to perform a method of generating a three-dimensional (3D) image of a dental object, the method comprising:
projecting, using a first optical component, light that has been reflected by an illuminated dental object and that has passed through a first aperture of a camera, onto a first portion of an image sensor;
projecting, using a second optical component, light that has been reflected by the illuminated dental object and that has passed through a second aperture of the camera, onto a second portion of the image sensor;
receiving a first two-dimensional (2D) color image data of the illuminated dental object from the first portion of the image sensor, the first 2D color image data includes a first plurality of color pixel values;
receiving a second two-dimensional (2D) color image data of the illuminated dental object from the second portion of the image sensor, the second 2D color image data includes a second plurality of color pixel values;
wherein the first aperture of the camera is different from the second aperture of the camera;
generating a color information texture map based on the first and second 2D color image data;
generating first and second 2D monochrome image data respectively corresponding to the first and second 2D color image data by applying a monochrome conversion to the first and second 2D color image data;
generating 3D data, using particles of an optical contrast powder or contrast enhancing features of structured illumination light as reference markers, to correlate the first 2D monochrome image data with the second 2D monochrome image data;
generating a 3D model of the illuminated object from the 3D data;
generating 3D color image data by overlaying pixels of the color information texture map on the 3D model of the illuminated object
downsampling the first 2D color image data such that a downsampled first 2D color image data includes a third plurality of color pixel values,
downsampling the second 2D color image data such that a downsampled second 2D color image data includes a fourth plurality of color pixel values,
wherein a number of color pixel values in the third plurality of color pixel values is smaller than another number of color pixel values in the first plurality of color pixel values,
wherein a number of color pixel values in the fourth plurality of color pixel vales is smaller than another number of color pixel values in the second plurality of color pixel values, wherein the monochrome conversion is applied to the downsampled first and second 2D color image data in the generating of the first and second 2D monochrome image data.

22. A three-dimensional (3D) scanning system for generating a three-dimensional (3D) image of a dental object, the 3D scanning system comprising:
a camera including a housing with a light source, a first aperture, a second aperture, different from the first aperture and a color image sensor having a first portion and a second portion, disposed in said housing,
wherein the first portion of the color image sensor generates first two-dimensional (2D) color image data based on light projected by the light source, reflected by the object, passed through the first aperture and projected onto the first portion of the color image sensor by a first optical component, the first 2D color image data includes a first plurality of color pixel values and
wherein the second portion of the color image sensor generates second 2D color image data based on light projected by the light source, reflected by the object, passed through the second aperture and projected onto the second portion of the color image sensor by a second optical component, the second 2D color image data includes a second plurality of color pixel values; and at least one processor operable to:
  generate a color information texture map based on the first and second 2D color image data;
  generate first and second 2D monochrome image data respectively corresponding to the first and second 2D color image data by applying a monochrome conversion to the first 2D color image data and the second 2D color image data;
  generate 3D data, using particles of an optical contrast powder or contrast enhancing features of structured illumination light as reference markers, to correlate the first 2D monochrome image data with the second 2D monochrome image data;
  generate a 3D model of the illuminated object from the 3D data; and
  generate 3D color image data by overlaying pixels of the color information texture map on the 3D model of the illuminated object
  downsample the first 2D color image data such that a downsampled first 2D color image data includes a third plurality of color pixel values,
  downsample the second 2D color image data such that a downsampled second 2D color image data includes a fourth plurality of color pixel values,
  wherein a number of color pixel values in the third plurality of color pixel values is smaller than another number of color pixel values in the first plurality of color pixel values,
  wherein a number of color pixel values in the fourth plurality of color pixel vales is smaller than another number of color pixel values in the second plurality of color pixel values,
  wherein the monochrome conversion is applied to the downsampled first and second 2D color image data in the generating of the first and second 2D monochrome image data.

23. A three-dimensional (3D) scanning system, comprising:
  a user interface, operable by a user to input a signal specifying selection of one of a plurality of operating modes of the 3D scanning system; and
  a processor, responsive to the signal specifying a first one of the operating modes, for
    projecting, using a first optical component, light that has been reflected by an illuminated dental object and that has passed through a first aperture of a camera, onto a first portion of an image sensor;
    projecting, using a second optical component, light that has been reflected by the illuminated dental object and that has passed through a second aperture of the camera, onto a second portion of the image sensor;
    receiving a first two-dimensional (2D) color image data of the illuminated dental object from the first portion of the image sensor, the first 2D color image data includes a first plurality of color pixel values;
    receiving a second two-dimensional (2D) color image data of the illuminated dental object from the second portion of the image sensor, the second 2D color image data includes a second plurality of color pixel values;
    wherein the first aperture of the camera is different from the second aperture of the camera;
    generating a color information texture map based on the first and second 2D color image data;
    generating first and second 2D monochrome image data respectively corresponding to the first and second 2D color image data by applying a monochrome conversion to the first and second 2D color image data,
    generating 3D data, using particles of an optical contrast powder or contrast enhancing features of structured illumination light as reference markers, to correlate the first 2D monochrome image data with the second 2D monochrome image data,
    generating a 3D model of the illuminated object from the 3D data, and
    generating 3D color image data by overlaying pixels of the color information texture map on the 3D model of the illuminated object
    downsampling the first 2D color image data such that a downsampled first 2D color image data includes a third plurality of color pixel values,
    downsampling the second 2D color image data such that a downsampled second 2D color image data includes a fourth plurality of color pixel values,
    wherein a number of color pixel values in the third plurality of color pixel values is smaller than another number of color pixel values in the first plurality of color pixel values,
    wherein a number of color pixel values in the fourth plurality of color pixel vales is smaller than another number of color pixel values in the second plurality of color pixel values,
    wherein the monochrome conversion is applied to the downsampled first and
    second 2D color image data in the generating of the first and second 2D monochrome image data,
  the processor also being responsive to the signal specifying selection of a second one of the operating modes, for generating further 2D color image data corresponding to the illuminated object.

24. The 3D scanning system of claim 23, further comprising:
  a display unit that displays at least one of the 3D color image data, the first 2D color image data, the second 2D color image data, and the further 2D color image data.

25. A method of operating a three-dimensional (3D) scanning system, comprising:
  selecting between a plurality of operating modes;
  in response to a selection of a first one of the operating modes,
    projecting, using a first optical component, light that has been reflected by an illuminated dental object and that has passed through a first aperture of a camera, onto a first portion of an image sensor;
    projecting, using a second optical component, light that has been reflected by the illuminated dental object and that has passed through a second aperture of the camera, onto a second portion of the image sensor;
    receiving a first two-dimensional (2D) color image data of the illuminated dental object from the first portion of the image sensor, the first 2D color image data includes a first plurality of color pixel values;
    receiving a second two-dimensional (2D) color image data of the illuminated dental object from the second portion of the image sensor, the second 2D color image data includes a second plurality of color pixel values;
    wherein the first aperture of the camera is different from the second aperture of the camera;

generating a color information texture map based on the first and second 2D color image data, generating first and second 2D monochrome image data respectively corresponding to the first and second 2D color image data by applying a monochrome conversion to the first and second 2D color image data, generating 3D data, using particles of an optical contrast powder or contrast enhancing features of structured illumination light as reference markers, to correlate the first 2D monochrome image data with the second 2D monochrome image data, generating a 3D model of the illuminated object from the 3D data, and generating 3D color image data by overlaying pixels of the color information texture map on the 3D model of the illuminated object, downsampling the first 2D color image data such that a downsampled first 2D color image data includes a third plurality of color pixel values, downsampling the second 2D color image data such that a downsampled second 2D color image data includes a fourth plurality of color pixel values, wherein a number of color pixel values in the third plurality of color pixel values is smaller than another number of color pixel values in the first plurality of color pixel values, wherein a number of color pixel values in the fourth plurality of color pixel vales is smaller than another number of color pixel values in the second plurality of color pixel values, wherein the monochrome conversion is applied to the downsampled first and second 2D color image data in the generating of the first and second 2D monochrome image data; and in response to a selection of a second one of the operating modes, generating further 2D color image data corresponding to the illuminated object.

26. The method of claim 25, further comprising:

displaying at least one of the 3D color image data, the first 2D color image data, the second 2D color image data, and the further 2D color image data, on a display unit.

* * * * *